(12) United States Patent
Guenther et al.

(10) Patent No.: US 6,945,767 B2
(45) Date of Patent: Sep. 20, 2005

(54) SMALL PITCH NOZZLE WITH A THERMALLY CONDUCTIVE INSERT FOR AN INJECTION MOLDING APPARATUS

(75) Inventors: Hans Guenther, Georgetown (CA); Beilei Yan, Mississauga (CA)

(73) Assignee: Mold-Masters Limited, Ontario (CA)

( * ) Notice: Subject to any disclaimer, the term of this patent is extended or adjusted under 35 U.S.C. 154(b) by 169 days.

(21) Appl. No.: 10/304,747

(22) Filed: Nov. 27, 2002

(65) Prior Publication Data

US 2003/0124216 A1 Jul. 3, 2003

Related U.S. Application Data

(60) Provisional application No. 60/333,735, filed on Nov. 29, 2001.

(51) Int. Cl.[7] .............................. B29C 45/20
(52) U.S. Cl. .................. 425/549; 264/328.15
(58) Field of Search ..................... 425/549; 264/328.15

(56) References Cited

U.S. PATENT DOCUMENTS

| | | |
|---|---|---|
| 4,094,447 A | 6/1978 | Gellert |
| 4,279,588 A | 7/1981 | Gellert |
| 4,312,630 A | 1/1982 | Travaglini |
| 4,450,999 A | 5/1984 | Gellert |
| 4,689,473 A | 8/1987 | Muller |
| 4,921,708 A | 5/1990 | Gellert |
| 5,206,040 A | 4/1993 | Gellert |
| 5,268,184 A | 12/1993 | Gellert |
| 5,299,928 A * | 4/1994 | Gellert ................. 425/190 |
| 5,316,468 A | 5/1994 | Günther |
| 5,474,439 A * | 12/1995 | McGrevy ............... 425/549 |
| 5,641,526 A | 6/1997 | Gellert |
| 5,652,003 A | 7/1997 | Gellert |
| 5,702,735 A | 12/1997 | Martin et al. |
| 5,871,786 A * | 2/1999 | Hume et al. ............ 425/549 |
| 5,939,018 A | 8/1999 | Ohtsubo et al. |
| 6,318,990 B1 | 11/2001 | Gellert et al. |
| 6,688,875 B2 * | 2/2004 | Babin ..................... 425/549 |

* cited by examiner

Primary Examiner—Tim Heitbrink
(74) Attorney, Agent, or Firm—Sterne, Kessler, Goldstein & Fox, P.L.L.C.

(57) ABSTRACT

A nozzle for an injection molding apparatus is provided. The nozzle includes a nozzle body, a heater and an insert. The nozzle body defines a first melt channel therein. The first melt channel is adapted to be downstream from and in fluid communication with a melt source. The nozzle body has a downstream nozzle body end. The nozzle body is made from a nozzle body material. The heater is thermally connected to the nozzle body. The insert is positioned in the nozzle body. The insert is made of an insert material. The insert material is more thermally conductive than the nozzle body material. The insert is adapted to conduct heat from the heater towards the downstream nozzle body end.

31 Claims, 5 Drawing Sheets

SMALL PITCH NOZZLE WITH A THERMALLY CONDUCTIVE INSERT FOR AN INJECTION MOLDING APPARATUS

This application claims the benefit of U.S. Provisional Application No. 60/333,735 filed on Nov. 29, 2001.

FIELD OF THE INVENTION

This invention relates to an injection molding apparatus, and more particularly to a small pitch nozzle for an injection molding apparatus.

BACKGROUND OF THE INVENTION

For many injection molding applications, it is desirable to position the mold cavities as close together as possible, to maximize the number of articles that can be molded using a given size of injection molding machine. For molded articles that are small, such as contact lenses, the nozzles on a typical injection molding machine may be a limiting factor in terms of how closely spaced the mold cavities can be. This is because the nozzles themselves may be too wide to position as close together as would be desirable.

One approach to permitting a small mold cavity-to-mold cavity spacing is to use multi-tip nozzles. A multi-tip nozzle is a nozzle that has a primary melt channel that receives melt and that divides into several secondary melt channels. The nozzle has several tips at its end, through which the secondary melt channels exit into several mold cavities. Several types of multi-tip nozzles are known.

An example of such a multi-tip nozzle is shown in U.S. Pat. No. 5,268,184 (Gellert). Gellert discloses a multi-tip nozzle having a forward portion with a central melt channel that divides into several smaller melt channels. The forward portion has several tips out of which melt flows into several mold cavities. At each tip, a rod made from a wear resistant material is inserted into a machined bore and welded to the rest of the forward portion.

A separate but related issue exists with nozzles, and particularly small-pitch nozzles, on typical injection molding machines. Typically, an injection molding machine includes a mold cavity block that is maintained at a lower temperature than the nozzle for at least a portion of an injection molding cycle. A downstream portion of the nozzle is usually proximate and may even contact the mold cavity block. As a result, the nozzle may be subject to the cooling effects of the mold cavity block. Thus, the temperature profile of melt in a typical nozzle of the prior art shows that the temperature of the melt is lower at the downstream end of the nozzle body and higher in the middle region. In order to heat the downstream end of the nozzle it is desirable to position the heater as close as possible to the downstream end, however space constraints may prevent the heater from being positioned as far downstream on the nozzle as would be desirable to counteract the heat loss into the mold cavity block. Such space constraints may be worse for a multi-tip nozzle than for a typical single-tip nozzle.

Furthermore, nozzles on injection molding machines are often immediately downstream from a manifold block, which transfers melt to the nozzles from a melt source. Typically, the manifold block is maintained at a lower temperature than the nozzle, and as a result, the nozzle can lose heat into the manifold block at its upstream end.

As a result, the temperature profile of a typical nozzle shows a maximum temperature in a middle region of the nozzle, and lower temperatures at the upstream and downstream ends.

Depending on the configuration of the nozzle and the particular material being injection molded, it may be difficult to heat the nozzle in such a way as to have melt in the downstream end of the nozzle at an acceptably high temperature to penetrate the mold cavity fully, without burning the melt in the middle region of the nozzle. Conversely, reducing the temperature of the melt in the nozzle to ensure that the melt in the middle region doesn't burn, may cause the melt at the downstream end to become too cold to flow as desired into the mold cavity. Other problems can also occur with the melt if it is too hot or too cold also.

SUMMARY OF THE INVENTION

In a first aspect, the invention is directed to a nozzle for an injection molding apparatus. The nozzle includes a nozzle body, a heater and an insert. The nozzle body defines a first melt channel therein. The first melt channel is adapted to be downstream from and in fluid communication with a melt source. The nozzle body has a downstream nozzle body end. The nozzle body is made from a nozzle body material. The heater is thermally connected to the nozzle body. The insert is positioned in the nozzle body. The insert is made of an insert material. The insert material is more thermally conductive than the nozzle body material. The insert is adapted to conduct heat from the heater towards the downstream nozzle body end.

In a second aspect, the invention is directed to a nozzle for an injection molding apparatus. The injection molding apparatus includes a mold cavity block. The nozzle includes a nozzle body, a heater and an insert. The nozzle body defines a first melt channel therein. The first melt channel is adapted to be downstream from and in fluid communication with a melt source. The nozzle body has a downstream nozzle body end. The downstream nozzle body end is adapted to be proximate the mold cavity block. The nozzle body has a middle nozzle body region. The middle nozzle body region is adapted to be farther from the mold cavity block than the downstream nozzle body end. The nozzle body is made from a nozzle body material. The heater is thermally connected to the nozzle body. The insert is positioned in the nozzle body. The insert is made of an insert material that is more thermally conductive than the nozzle body material. The insert is positioned between the heater and the first melt channel and is adapted to conduct heat away from the middle nozzle body region.

In a third aspect, the invention is directed to an injection molding apparatus that incorporates therein at least one of the nozzles described above.

DESCRIPTION OF THE DRAWINGS

For a better understanding of the present invention and to show more clearly how it may be carried into effect, reference will now be made by way of example to the accompanying drawings, in which:

FIG. 5b is an end view of the nozzle shown in FIG. 5a.

DESCRIPTION OF THE PREFERRED EMBODIMENT

The following patents are incorporated by reference: U.S. Pat. No. 4,921,708 (Gellert) and U.S. Pat. No. 5,702,735 (Martin et al.).

Figure 1:
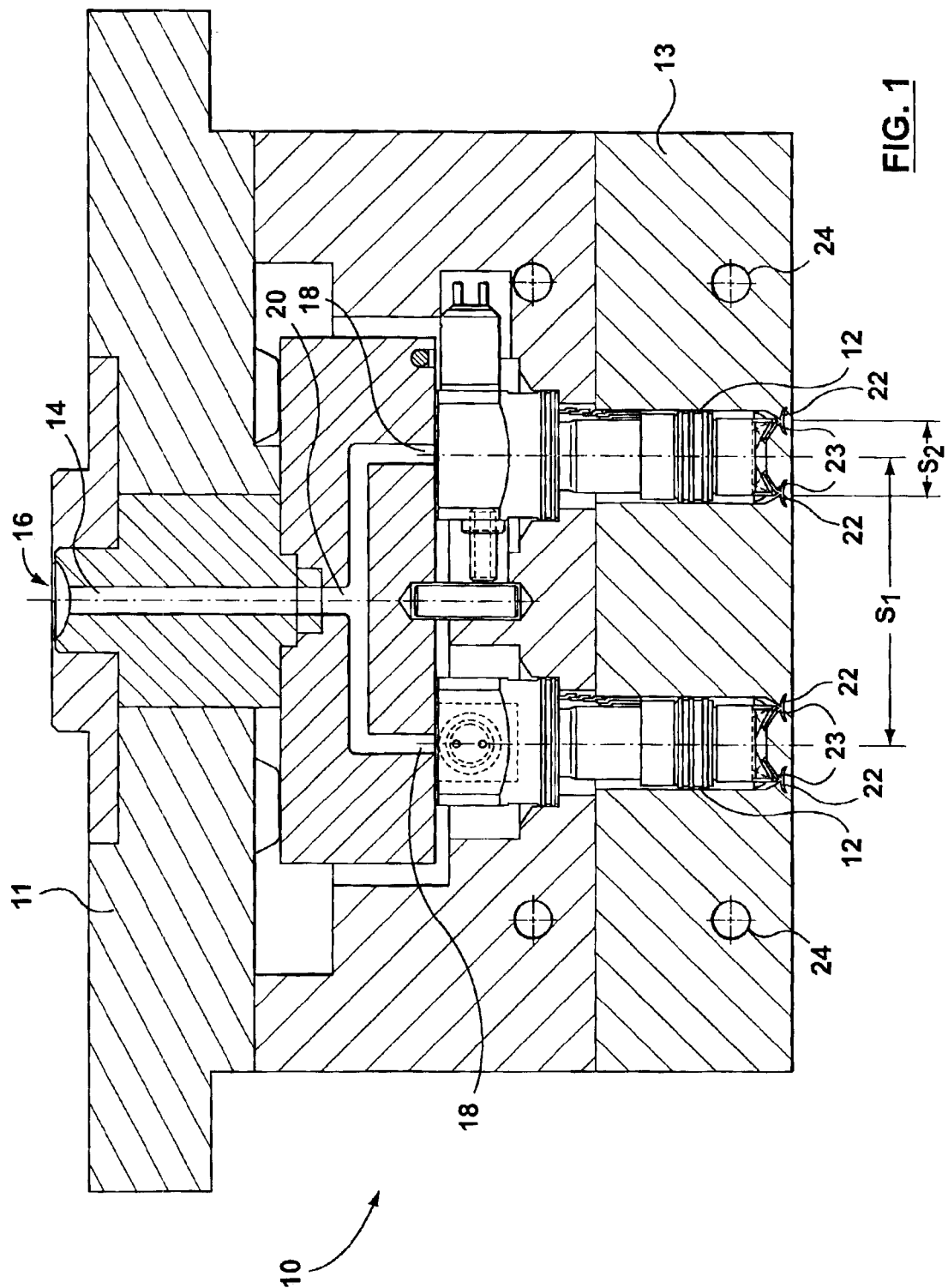
FIG. 1 is a partial sectional view of a portion of an injection molding apparatus having several nozzles in accordance with a first embodiment of the present invention.

Reference is made to FIG. 1, which shows an injection molding apparatus 10 having a melt channel block 11, a plurality of nozzles 12, in accordance with a first embodiment of the present invention, and a mold cavity block 13. Melt channel block 11 has a plurality of runners 14, which in turn have an inlet 16 for receiving melt from a melt source (not shown), and which have a plurality of discharges 18, for discharging melt into nozzles 12. It is shown in FIG. 1, that injection molding apparatus 10 has only one division in runners 14 (shown at 20), however, it is contemplated that injection molding apparatus 10 may include a greater number of runner divisions. Furthermore, injection molding apparatus 10 may be a single multi-cavity molding apparatus, or a stack-mold machine, or any other suitable type of injection molding apparatus.

Mold cavity block 13 contains a plurality of mold cavities 22, each having a gate 23. Gates 23 permit the transfer of melt into the mold cavities 22. Mold cavity block 13 may be cooled to assist in the solidification of melt in the mold cavities 22. The cooling may be effected, for example, by passing coolant through cooling channels 24.

Figure 2:
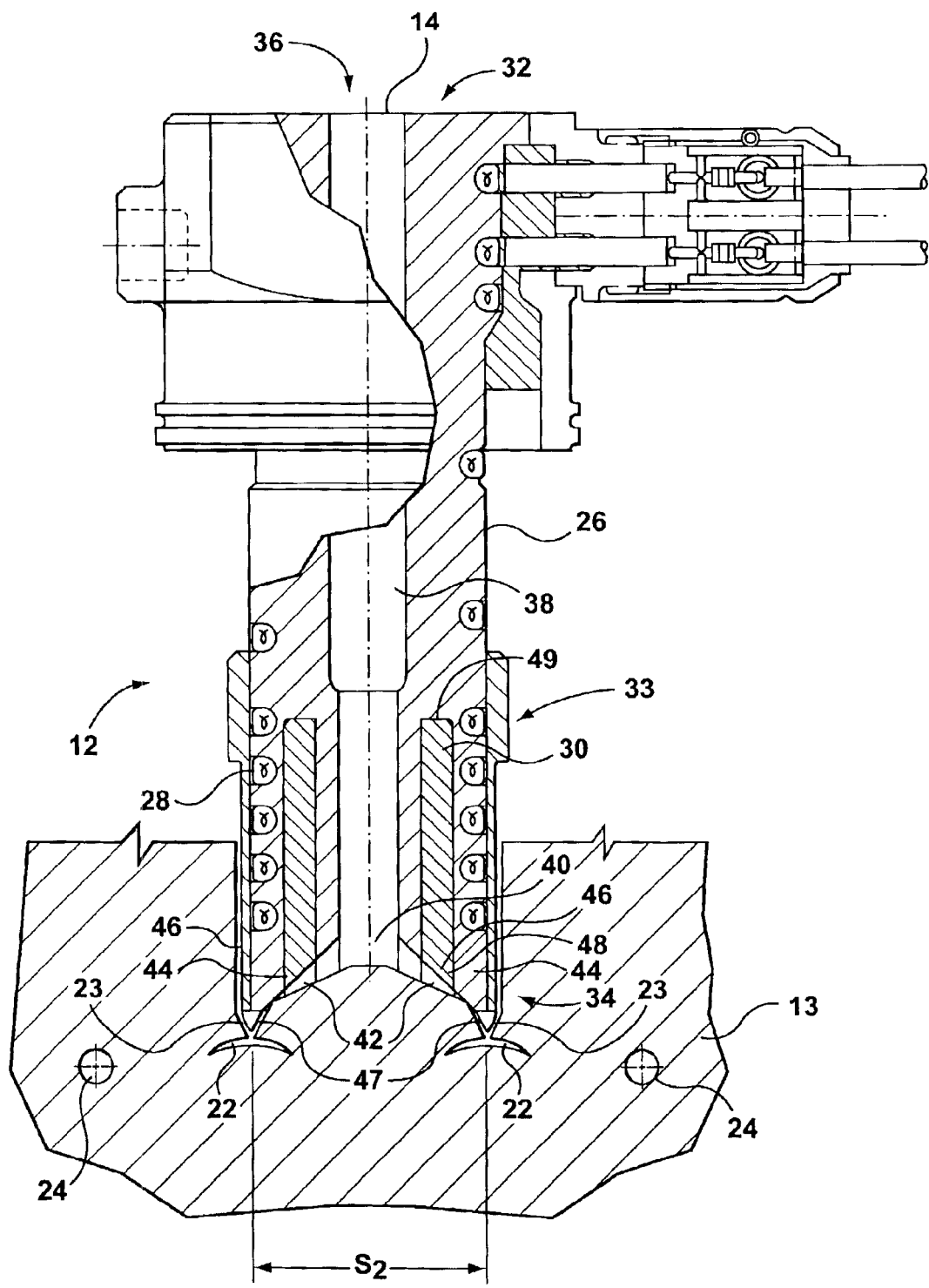
FIG. 2 is a sectional view of one of the nozzles shown in FIG. 1.

Reference is made to FIG. 2, which shows nozzle 12 in more detail. Nozzle 12 may be a multi-tip nozzle, and may thus, transfer melt from a runner 14 to a plurality of mold cavities 22. Nozzle 12 may transfer melt into two, three, four or more mold cavities, as desired. It is alternatively possible for nozzle 12 to be a single-tip nozzle, and thus, to transfer melt into a single mold cavity 22.

Nozzle 12 has a body 26, a heater 28 and an insert 30. Nozzle body 26 has an upstream end 32, a middle region 33 and a downstream end 34. The upstream end 32 may be connected to the melt channel block 11. At the upstream end 32 is an inlet 36 to a first nozzle melt channel 38. The first melt channel 38 receives melt from one of the runners 14. The first melt channel 38 has a downstream end 40, where it communicates with a plurality of optional channels 42 formed in a plurality of optional ribs 44 that extend outwards at the downstream end 34 of nozzle body 26. An axis A extends along the center of the first melt channel 38.

Ribs 44 contact mold cavity block 13, so that channels 42 and mold cavity block 13 together define a plurality of second nozzle melt channels 46 that extend from the first nozzle melt channel 38 to a plurality of gates 23. At the end of each rib 44, there may be an optional tip 47. The tip 47 may be a small conical projection that extends into one of the gates 23 to heat melt flowing therethrough.

It is alternatively possible that the second melt channels 46 could be formed directly in the nozzle body 26, instead of being formed by mating surfaces of the nozzle 12 and the mold cavity block 13.

The nozzle body 26 may made from any suitably thermally conductive material such as high speed steel. The tips 47 may be made from the same material as the rest of nozzle body 26, and may include a wear-resistant coating, such as tungsten carbide. Alternatively, the tips 47 may be made from a wear-resistant material, such as tungsten carbide.

The nozzle is heated by heater 28. Heater 28 may be embedded in nozzle body 26, as shown in FIG. 2, and may extend along some or most of the length of the nozzle body 26.

The mold cavity block 13 may be maintained at a lower temperature than the nozzle 12, for at least a portion of an injection molding cycle. The portion of the nozzle 12 that is proximate the mold cavity block 13 may therefore, be subject to the cooling effects thereof. Thus, the temperature of the melt is lower at the downstream end 34 of the nozzle body 26 and higher in the middle region 33, which is typically farther away from the mold cavity block 13 than is the downstream end 34.

The insert 30 is positioned in the nozzle body 26 to provide increased heat transfer from the hotter middle region 33 to melt in the cooler downstream end 34. In doing so, the insert 30 provides the melt in the nozzle 12 with a more uniform temperature profile that would be obtained by the same nozzle construction without the insert 30.

The insert 30 is preferably made from a thermally conductive material, such as, for example, copper, silver, aluminum, gold and alloys of these materials. The material of the insert 30 has a higher thermal conductivity than the material of the nozzle body 26, so as to preferentially conduct heat from heater 28 towards melt in the downstream end 34 of the nozzle body 26.

Figure 3:
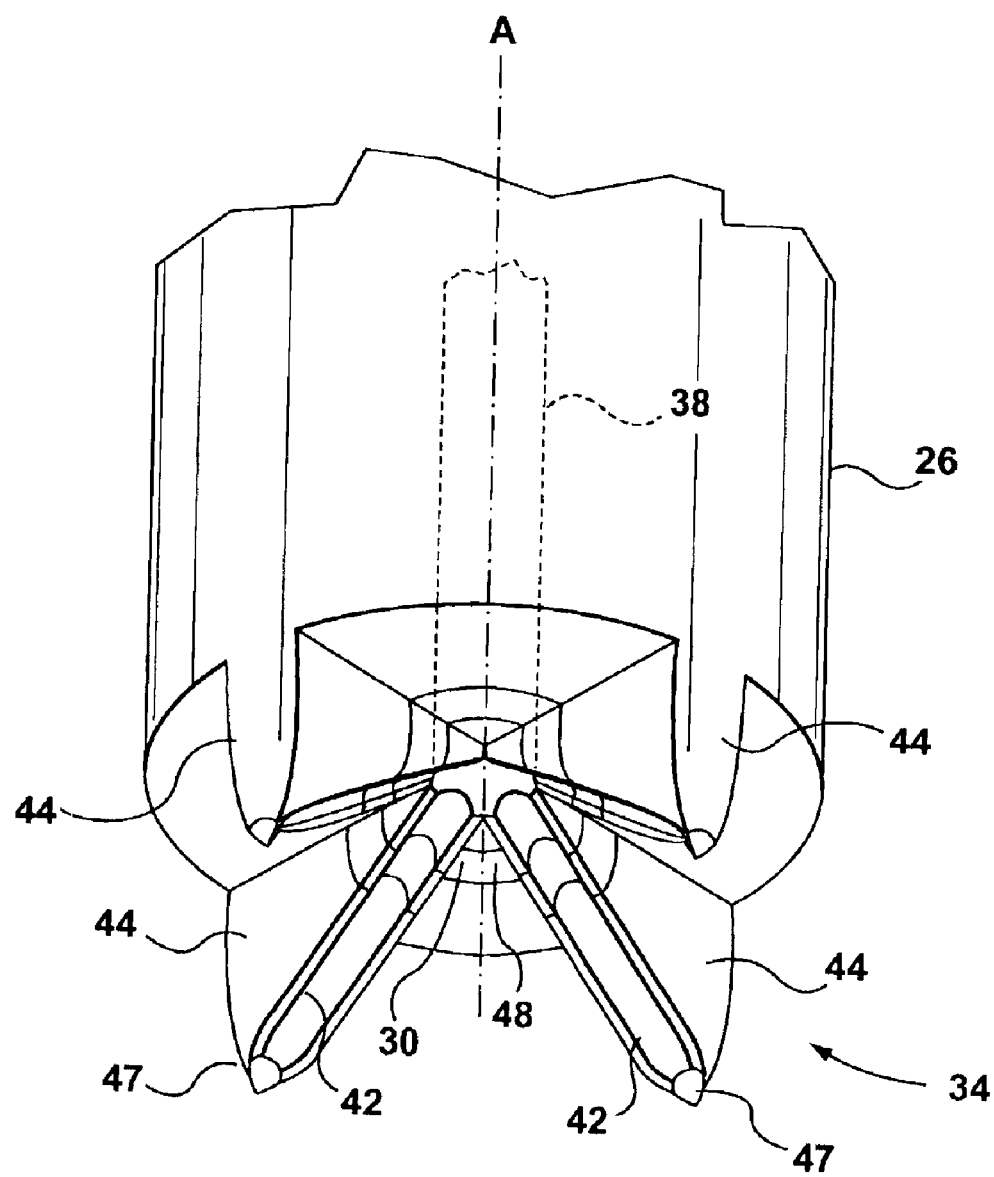
FIG. 3 is a perspective view of the downstream end of the nozzle shown in FIG. 2.

The insert 30 has a downstream end 48 and an upstream end 49. The downstream end 48 may be exposed in the second nozzle melt channels 46. The downstream end 48 of the insert 30 may optionally be even with the wall of the second melt channels 46, in the sense that it neither extends into nor is recessed from the second melt channel 46, as shown more clearly in FIG. 3. By exposing the downstream end 48 of the insert 30 in the second melt channels 46, at least some of the heat contained in the insert 30 is transferred directly to melt that is proximate the gates 23.

It is alternatively possible for the downstream end 48 of the insert 30 to be buried within the nozzle body 26, so that it is not directly exposed to the melt and is not subject to wear from the melt. For example, the downstream end 48 of the insert 30 may be covered by a layer of protective material that is more wear-resistant than the material of the insert 30 itself. The layer of material may be the same material as the rest of the nozzle body 26, or may be another material.

The upstream end 49 of the insert may be positioned anywhere suitable in the nozzle body 26. For example, the upstream end 49 may be positioned closer to some portion of the heater 28 than is the downstream end 34.

Depending on the temperature distribution throughout the nozzle body 26, it is possible that the point of maximum temperature in the insert 30 will be at some intermediate point along the axial length of the insert 30, instead of at the upstream end 49. In that case, heat will be conducted from that point of maximum temperature, towards both the upstream and downstream ends 49 and 48.

The insert 30 may be positioned radially between at least a portion of the heater 28 and the first nozzle melt channel 38, as shown in the Figures. By positioning the insert 30 in this way, the overall nozzle-to-nozzle pitch, which is shown at S1 in FIG. 1 and the tip-to-tip pitch within nozzle 12, which is shown at S2 in FIG. 1, may be kept smaller than if the insert 30 was positioned outside of the heater 28.

Furthermore, the insert 30 imparts a more uniform melt temperature profile over the axial length of the nozzle 12, relative to typical nozzles of the prior art. This is because the insert 30 conducts some heat that would otherwise be transferred to melt in the middle region 33, away to the downstream end 34 of the nozzle body 26. In doing so, the temperature of the melt in the middle region 33 may be reduced, and the temperature of the melt at the downstream end 34 may be increased. By making the temperature of the melt more uniform along the length of the nozzle 12, the risks are reduced of overheating the melt in the middle region 33, and of having the melt be too cool at the downstream end 34.

The insert 30 may be press-fit into a corresponding cylindrical groove in nozzle body 26, or may alternatively be brazed in, cast in, or otherwise joined to the nozzle body 26.

The insert 30 may be generally cylindrical and may be generally centered about the nozzle melt channel axis A. By making the insert 30 cylindrical, the heat is conducted relatively evenly from all circumferential points around the nozzle body 26 to the downstream end 34 of the nozzle body 26.

Figure 4:
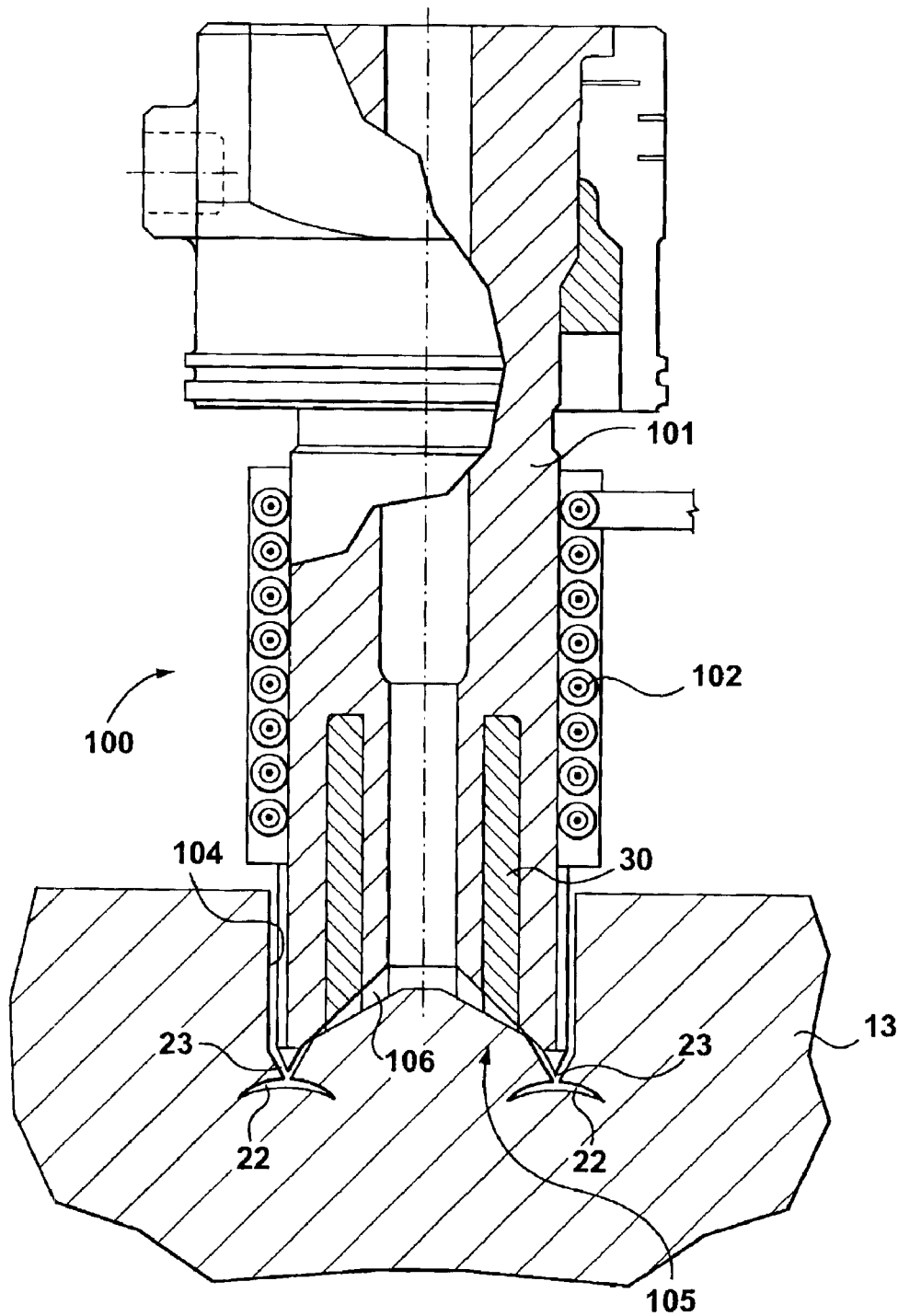
FIG. 4 is a sectional view of a nozzle in accordance with a second embodiment of the present invention.

Reference is made to FIG. 4, which shows a nozzle 100 made in accordance with a second embodiment of the present invention. Nozzle 100 may be used in injection molding apparatus 10 (FIG. 1). Nozzle 100 may be similar to nozzle 12 (FIG. 1) except that nozzle 100 has a nozzle body 101, an external heater 102 instead of an embedded heater, and insert 30.

The heater 102 mounts to the exterior of the nozzle body 101, and may be removable from the nozzle body 101 for repair or replacement.

A portion of the nozzle body 101 is positioned within a bore 104 in the mold cavity block 13. Because of this, the heater 102 may not extend to a downstream end 105 of the nozzle body 101. Thus, the heater 102 may not be positioned as close as would otherwise be desired to the downstream end 105 and to the second nozzle melt channels, which are shown at 106. The insert 30 conducts heat from heater 102 to the downstream end 105 and to the second melt channels 106 to heat melt therein.

Figure 5A:
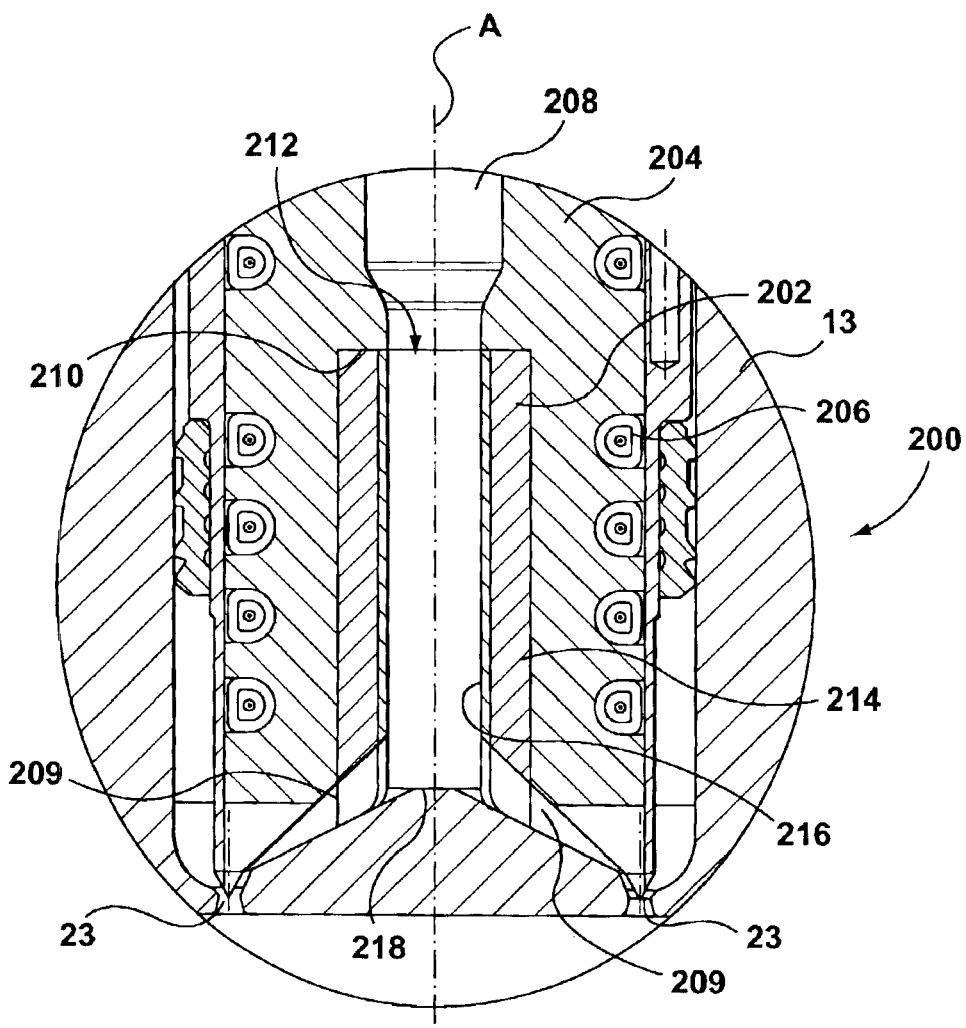
FIG. 5a is a sectional view of a nozzle in accordance with a third embodiment of the present invention.
Figure 5B:
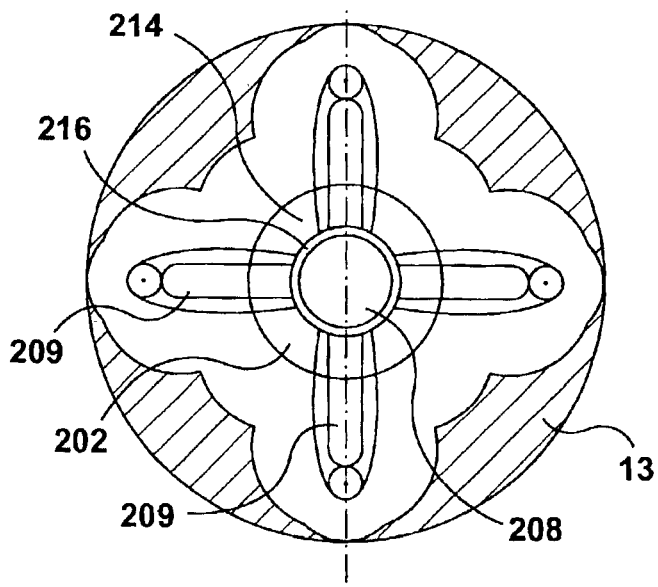

Reference is made to FIGS. 5a and 5b, which show a nozzle 200 made in accordance with a third embodiment of the present invention. Nozzle 200 may be similar to nozzle 12, (FIG. 1), but includes an insert 202 instead of the insert 30 (FIG. 1), and also includes a nozzle body 204 and a heater 206.

The nozzle body 204 defines a portion of a first nozzle melt channel 208, and a portion of a plurality of second melt channels 209 that extend from the first melt channel 208 to the gates 23. The nozzle body 204 has a seat 210 therein that is directly adjacent the first nozzle melt channel 208 for receiving the insert 202.

The insert 202 is seated against the seat 210 and contains a pass-through 212 that defines a portion of the first nozzle melt channel 208.

The insert 202 includes an outer, thermally conductive portion 214 and an inner coating 216 which may be both wear-resistant and thermally insulative. The outer portion 214 conducts heat from the heater 206 to melt at the downstream end of the first nozzle melt channel 208 and to the melt in the second melt channels 209. The insert 202 has a downstream end 218, which contacts the melt flowing in the second melt channels 209. The coating 216 may be applied to any suitable portion of the 'wetted' surface area of the insert 202. The 'wetted' surface area of the insert 202 is the portion of the surface area of the melt that is exposed to melt.

It is contemplated that this invention may be applied to a nozzle that has a single outlet, leading to a single mold cavity. In that case, the insert may be configured so that its downstream end is positioned proximate the downstream end of the nozzle melt channel, near where the melt enters the gate to the mold cavity.

While the above description constitutes the preferred embodiments, it will be appreciated that the present invention is susceptible to modification and change without departing from the fair scope of the invention.

What is claimed is:

1. A nozzle for an injection molding apparatus, comprising:
   a nozzle body, wherein said nozzle body defines a first melt channel therein, said first melt channel is adapted to be downstream from and in fluid communication with a melt source, said nozzle body has a downstream nozzle body end and said nozzle body is made from a nozzle body material;
   a plurality of nozzle tips disposed on the downstream nozzle body end;
   a heater, wherein said heater is thermally connected to said nozzle body and is positioned around said first melt channel; and
   a generally cylindrical insert, wherein said insert is positioned within said nozzle body, and nozzle body such that said insert is spaced from said first melt channel, wherein said insert is made of an insert material, and said insert material is more thermally conductive than said nozzle body material,
   wherein said first melt channel is centered about an axis and said insert is centered about said axis.

2. A nozzle as claimed in claim 1, wherein said insert has a downstream insert end, and said downstream insert end is positioned proximate said downstream nozzle body end.

3. A nozzle as claimed in claim 1, wherein said insert has a downstream insert end, and a portion of said insert is positioned closer to said heater than is said downstream insert end.

4. A nozzle as claimed in claim 1, wherein said nozzle body further defines a plurality of second melt channels, wherein said plurality of second melt channels are downstream from and in fluid communication with said first melt channel.

5. A nozzle as claimed in claim 4, wherein said insert has a downstream insert end, and said downstream insert end is positioned proximate at least one second melt channel.

6. A nozzle as claimed in claim 5, wherein said downstream insert end is positioned proximate said plurality of second melt channels.

7. A nozzle as claimed in claim 5, wherein said downstream insert end is separated from said at least one second melt channel by a layer of protective material, and said layer of protective material is more resistant to degradation from melt flow than is said insert material.

8. A nozzle as claimed in claim 5, wherein at least a portion of said downstream insert end is exposed in said at least one second melt channel.

9. A nozzle as claimed in claim 1, wherein said insert is positioned between at least a portion of said heater and said first melt channel.

10. A nozzle as claimed in claim 1, wherein said heater has a downstream heater end and said downstream heater end is spaced from said downstream nozzle body end.

11. A nozzle for an injection molding apparatus, the injection molding apparatus including a mold cavity block, the nozzle comprising:
   a nozzle body, wherein said nozzle body defines a first melt channel therein and a plurality of second melt channels, said first melt channel is adapted to be downstream from and in fluid communication with a melt source, said plurality of melt channels are downstream from and in fluid communication with said first melt channel, said nozzle body has a downstream nozzle body end, and said nozzle body is made from a nozzle body material;

a plurality of nozzle tips disposed on the downstream nozzle body end proximate to the mold cavity block;

a heater, wherein said heater is thermally connected to said nozzle body; and an insert having a downstream insert end, wherein said insert is positioned such that said insert is spaced from said first melt channel and said downstream insert end is proximate at least one second melt channel, wherein said insert is made of an insert material, said insert material is more thermally conductive than said nozzle body material, said insert is positioned between at least a portion of said heater and said first melt channel, and at least a portion of said downstream insert end is exposed in said at least one second melt channel.

12. A nozzle as claimed in claim 11, wherein said insert has a downstream insert end, and said downstream insert end is positioned proximate said downstream nozzle body end so that heat may be conducted towards said downstream nozzle body end.

13. A nozzle as claimed in claim 11, wherein said insert is positioned between said heater and said first melt channel.

14. A nozzle as claimed in claim 11, wherein said heater is positioned around said first nozzle melt channel, and said insert is generally cylindrical.

15. A nozzle as claimed in claim 14, wherein said first melt channel is centered about an axis and said insert is centered about said axis.

16. An injection molding apparatus, comprising at least one nozzle, wherein said nozzle includes a nozzle body, a heater, a plurality of nozzle tips, and an annular insert;

wherein said nozzle body defines a first melt channel therein, said first melt channel is adapted to be downstream from and in fluid communication with a melt source, said nozzle body has a downstream nozzle body end and said nozzle body is made from a nozzle body material, and and wherein said nozzle body further defines a plurality of second melt channels, wherein said plurality of second melt channels are downstream from and in fluid communication with said first melt channel, and wherein each of said plurality of nozzle tips is disposed on the downstream nozzle body end proximate to a respective gate of a mold cavity, and wherein said heater is thermally connected to said nozzle body, and wherein said annular insert is positioned such that such that said annular insert is spaced from said first melt channel, sand wherein said annular insert is made of an insert material, and said insert material is more thermally conductive than said nozzle body material, wherein said insert has a downstream insert end, and said downstream insert end is positioned proximate at least one second melt channel.

17. An injection molding apparatus as claimed in claim 16, wherein said insert has a downstream insert end, and a portion of said insert is positioned closer to said heater than is said downstream insert end.

18. An injection molding apparatus as claimed in claim 16, wherein said downstream insert end is positioned proximate said plurality of second melt channels.

19. An injection molding apparatus as claimed in claim 16, wherein said downstream insert end is separated from said at least one second melt channel by a layer of protective material, and said layer of protective material is more resistant to degradation from melt flow than is said insert material.

20. An injection molding apparatus as claimed in claim 16, wherein at least a portion of said downstream insert end is exposed in said at least one second melt channel.

21. An injection molding apparatus as claimed in claim 16, wherein said insert is positioned between at least a portion of said heater and said first melt channel.

22. An injection molding apparatus as claimed in claim 16, wherein said heater is positioned around said first nozzle melt channel, and said insert is generally cylindrical.

23. An injection molding apparatus as claimed in claim 22, wherein said first melt channel is centered about an axis and said insert is centered about said axis.

24. An injection molding apparatus as claimed in claim 16, wherein said heater has a downstream heater end and said downstream heater end is spaced from said downstream nozzle body end.

25. An injection molding apparatus as claimed in claim 16, further comprising a mold cavity block, wherein said mold cavity block is adapted to be maintained at least intermittently at a lower temperature than said nozzle, and wherein said downstream nozzle body end is proximate said mold cavity block.

26. An injection molding apparatus comprising:

a mold cavity block; and at least one nozzle, wherein said mold cavity block defines at least one mold cavity and said mold cavity block is adapted to be maintained at least intermittently at a lower temperature than said nozzle, wherein said nozzle includes a nozzle body, a heater, a plurality of nozzle tips, and a generally cylindrical insert, wherein said nozzle body defines a first melt channel therein, said first melt channel is adapted to be downstream from and in fluid communication with a melt source, said nozzle body has a downstream nozzle body end, and said downstream nozzle body end is proximate said mold cavity block, said nozzle body has a middle nozzle body region, and said middle nozzle body region is farther from said mold cavity block than said downstream nozzle body end, and said nozzle body is made from a nozzle body material, wherein said heater is thermally connected to said nozzle body and positioned around said first nozzle melt channel, wherein said plurality of nozzle tips are disposed on the downstream nozzle body end, wherein said insert is positioned such that said insert is spaced from said first melt channel, wherein said insert is made of an insert material, said insert is more thermally conductive than said nozzle body material, said insert is positioned between at least a portion of said heater and said first melt channel, and wherein said first melt channel is centered about an axis and said insert is centered about said axis.

27. An injection molding apparatus as claimed in claim 26, wherein said insert has a downstream insert end, and said downstream insert end is positioned proximate said downstream nozzle body end so that heat may be conducted towards said downstream nozzle body end.

28. An injection molding apparatus as claimed in claim 26, wherein said insert is positioned between said heater and said first melt channel.

29. A nozzle for an injection molding apparatus, comprising:
- a nozzle body, wherein said nozzle body defines a first melt channel therein, said first melt channel is adapted to be downstream from and in fluid communication with a melt source, said nozzle body has a downstream nozzle body end and said nozzle body is made form a nozzle body material;
- a heater, herein said heater is thermally connected to said nozzle body and positioned around said first nozzle melt channel; and
- a generally cylindrical insert, wherein said insert is positioned within said nozzle body such that said insert is spaced from said first melt channel, and wherein said insert is made of an insert material, and said insert material is more thermally conductive than said nozzle body material, and wherein said first melt channel is centered about an axis and said insert is centered about said axis.

30. An injection molding apparatus as claimed in claim 29, wherein said insert has a downstream insert end, and said downstream insert end is positioned proximate said downstream nozzle body end so that heat may be conducted towards said downstream nozzle body end.

31. An injection molding apparatus as claimed in claim 29, wherein said insert is positioned between said heater and said first melt channel.

* * * * *